(12) United States Patent
Ifft

(10) Patent No.: US 7,308,832 B1
(45) Date of Patent: Dec. 18, 2007

(54) STRAIN GAGE DIFFERENTIAL PRESSURE MEASUREMENT IN A FLUID FLOW METER

(75) Inventor: Stephen A. Ifft, Longmont, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 11/737,890

(22) Filed: Apr. 20, 2007

(51) Int. Cl.
*G01F 1/32* (2006.01)

(52) U.S. Cl. .................................... 73/861.24
(58) Field of Classification Search ............. 73/861.22, 73/861.24, 861.21
See application file for complete search history.

(56) References Cited

U.S. PATENT DOCUMENTS

| | | | |
|---|---|---|---|
| 4,561,311 A | * | 12/1985 | Keyes et al. ............. 73/861.22 |
| 6,220,103 B1 | * | 4/2001 | Miller et al. ............. 73/861.22 |
| 7,258,024 B2 | * | 8/2007 | Dimarco et al. ......... 73/861.22 |

\* cited by examiner

*Primary Examiner*—Jewel Thompson
(74) *Attorney, Agent, or Firm*—Richard W. Hanes; January D. Barrett; Hanes & Schutz, LLC

(57) ABSTRACT

Apparatus and method for strain gage measurement of differential pressure across a body inserted into a flowing fluid where the body includes an exterior upstream facing portion, an exterior downstream facing portion and interior surfaces. At least one first electrically resistive strain gage having connecting terminals is disposed on one or more of the interior surfaces of the upstream facing portion and at least one second electrically resistive strain gage having connecting terminals is disposed on one or more of the interior surfaces of the downstream facing portion. The first and second strain gages are electrically connected to form the legs of a full Wheatstone Bridge, the electrical output of which is directly related to the differential pressure across the inserted body.

12 Claims, 6 Drawing Sheets

US 7,308,832 B1

STRAIN GAGE DIFFERENTIAL PRESSURE MEASUREMENT IN A FLUID FLOW METER

FIELD OF THE INVENTION

The present invention relates to strain gage measurement of fluid flow rate in a closed conduit using a bluff body flow meter such as a pitot tube that produces a differential pressure output.

BACKGROUND OF THE INVENTION

Flow rate measurement derived from differential pressure readings is common and is found in many types of fluid flow meters. Pitot tubes, for instance, sense the upstream total pressure of a flowing fluid and the downstream static pressure to produce a differential pressure value that is used to develop the rate of flow of the fluid that is impacting the pitot tube. Such devices include pressure ports leading to fluid plenums in the pitot tube body. Impulse lines then transmit the fluid pressure to a transducer that translates the respective fluid pressures to electrical signals that are transmitted to flow calculating devices.

One of the biggest difficulties with flow meters having plenums and impulse lines is their propensity for leakage and clogging. This problem requires frequent monitoring to insure that the lines are bled, the interconnecting manifold is zeroed and the associated transmitter is properly calibrated.

As subsequently described, the solution to the leakage problem proposed by the present invention is to substitute electrical connections for the plenums and impulse lines that conduct fluid. Electrical strain gages are the logical choice to convert fluid pressures and the resulting meter strain to electrical signals. Strain gages have been used in target flow meters for some time. Target flow meters provide flow measurement by sensing the fluid force acting on a target suspended in a flow stream. A typical strain gage target flow meter comprises a sensing element that includes a target rod, a calibrated target disk, mounting base, protective case and a sensing tube to which are attached electrical strain gages. In some applications four strain gages are attached to the sensing tube, two on the leading side of flow and two on the trailing side of the flow. Fluid flow produces a strain on the sensing tube, compressing the leading side strain gages and tensing the trailing side strain gages, causing their resistance to decrease and increase respectively. Target meters are limited in their use because the disc will only interact with a small portion of the flow stream. Therefore accuracy and range suffer and the signal is weak. The relatively small area of interaction with the fluid flow also eliminates the possibility of obtaining the averaging effect that is a prominent feature of a diametric pitot tube.

Another type of strain gage flow meter is shown in U.S. Pat. No. 4,604,906. The flow meter of that disclosure uses an airfoil shaped sensing element which is aligned with the flow of fluid. The flow responsive thrust on the sensing element created by differential pressure on the two sides of the airfoil is transverse to the direction of fluid flow.

Strain gages have also been employed with vortex shedding flow meters, such as the one disclosed in U.S. Pat. No. 4,791,818. In that disclosure frequency of the shedding vortices is measured by a cantilevered beam equipped with one or more strain gages.

Therefore, the principal object of the present invention is to provide a differential pressure flow meter that does not require fluid receiving plenums or impulse lines to convey pressure data.

A second objective of the invention is to apply the advantages of strain gage technology to the well known and widely accepted features of several types of fluid flow meters such as, for example, an averaging pitot tube, an orifice plate and a V-cone while at the same time eliminating the problems inherent with the use of impulse lines.

Other and further objects, features and advantages of the present invention will become apparent upon a reading of the following specification taken in conjunction with the accompanying drawings.

SUMMARY OF THE INVENTION

Apparatus of the present invention includes any one of several types of differential pressure measuring flow meters having a plurality of strain gages applied to the structure in a manner that will measure structural strain as a function of differential pressure across the meter. A preferred form of the apparatus comprises a pitot tube style bluff body that is insertable diametrically into the conduit that is carrying the fluid whose flow rate is to be measured. A flat faced bluff body of the type described in U.S. Pat. No. 6,321,166 will serve as the exemplary type of differential pressure flow meter body in which the present invention may advantageously be applied. Preferably, the bluff body is hollow, on the inside surfaces of which are attached a plurality of electrically resistive strain gages, such as the traditional foil strain gage. By interconnecting the resistive components of the strain gages to appropriate electrical measurement apparatus, such as a full Wheatstone bridge, the strains in the bluff body produced by the pressures of the flowing fluid are measured and displayed as the output voltage of the Wheatstone bridge, representative of the differential pressure being sensed in the flowing fluid.

DETAILED DESCRIPTION OF PREFERRED EMBODIMENT

Figure 1:
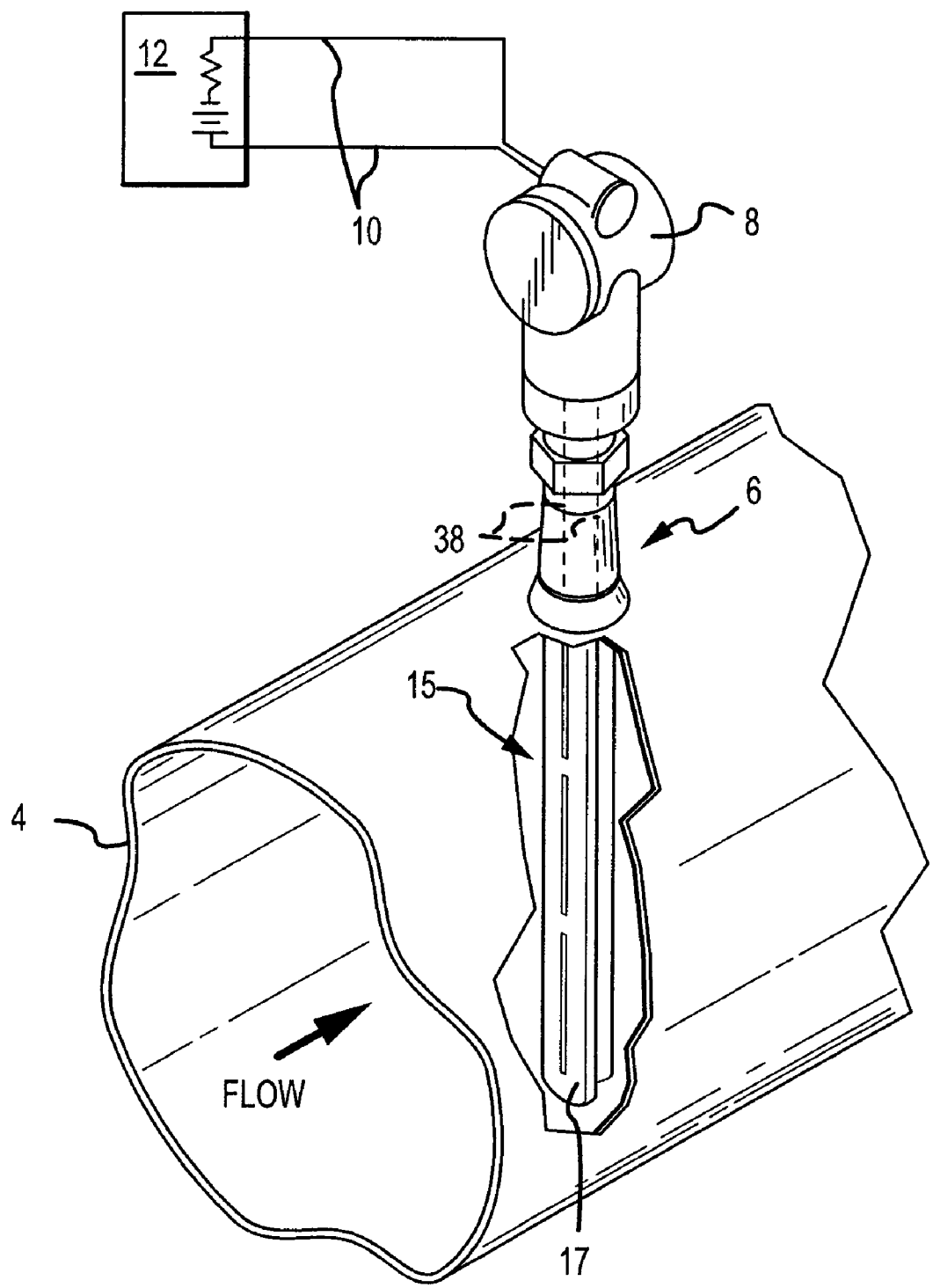
FIG. 1 is a fragmentary perspective view of a fluid conduit with a portion thereof cut away to show the diametric placement therein of the differential pressure measuring probe of the present invention and showing the external transmitter that conveys the differential pressure signal to a process control facility.

Referring first to FIG. 1, a cut away portion of a process fluid container such as a pipe, or closed conduit 4 into which a differential pressure measuring probe 6 of the averaging pitot tube type is installed. An electrical signal derived from resistive strain gages attached to the bluff body 15 of the probe indicates differential pressure in the fluid flowing in the conduit 4. The electrical signal is conducted to a transmitter 8 that conveys the signal through a control loop 10 to a process control facility 12 (modeled as a voltage source and a resistive load).

Although the probe 6 is illustrated in the drawings and discussed in this specification as having a flat faced "T" shaped hollow bluff body 15 of the type disclosed in U.S. Pat. No. 6,321,166, additional embodiments of the invention can utilize other configurations of pitot tubes that are subject to deformation and strain when subjected to the pressures of flowing fluid.

Figure 2:
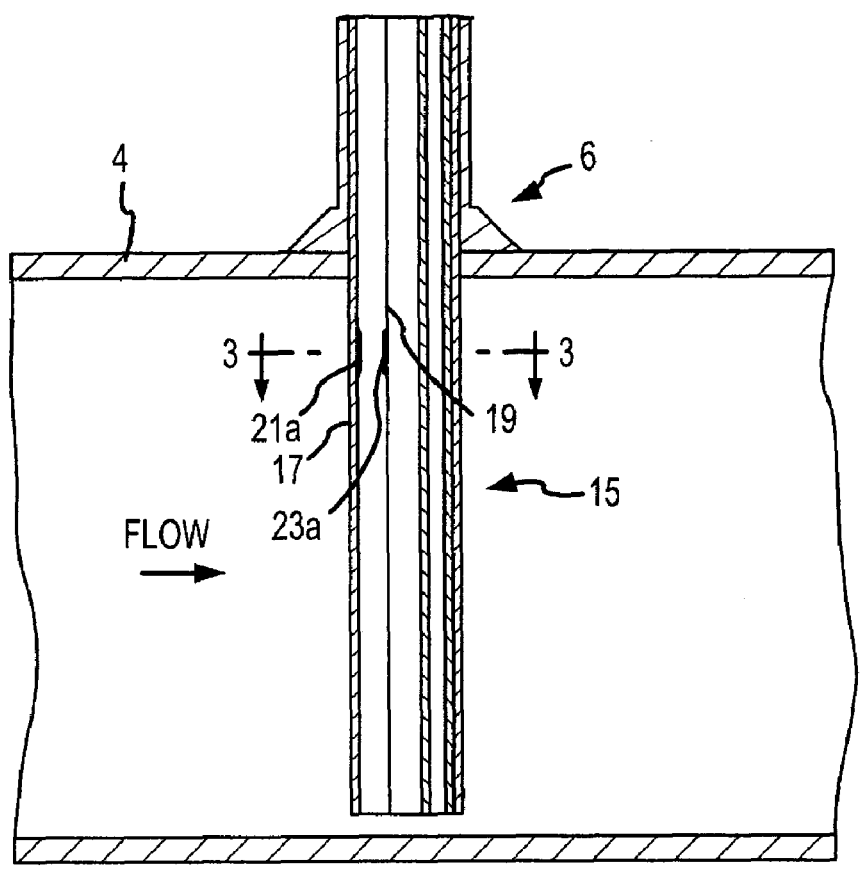
FIG. 2 is a side view of the bluff body of the differential pressure pitot tube type of flow meter of the present invention as it would be seen installed diametrically in the fluid carrying conduit of FIG. 1.
Figure 3:
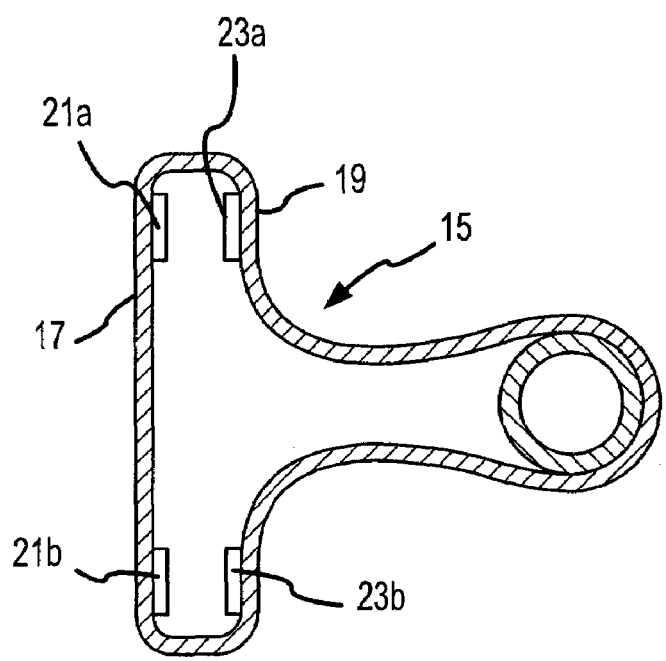
FIG. 3 is a cross sectional view of the bluff body of the measuring probe taken along lines 3-3 of FIG. 1.
Figure 4:
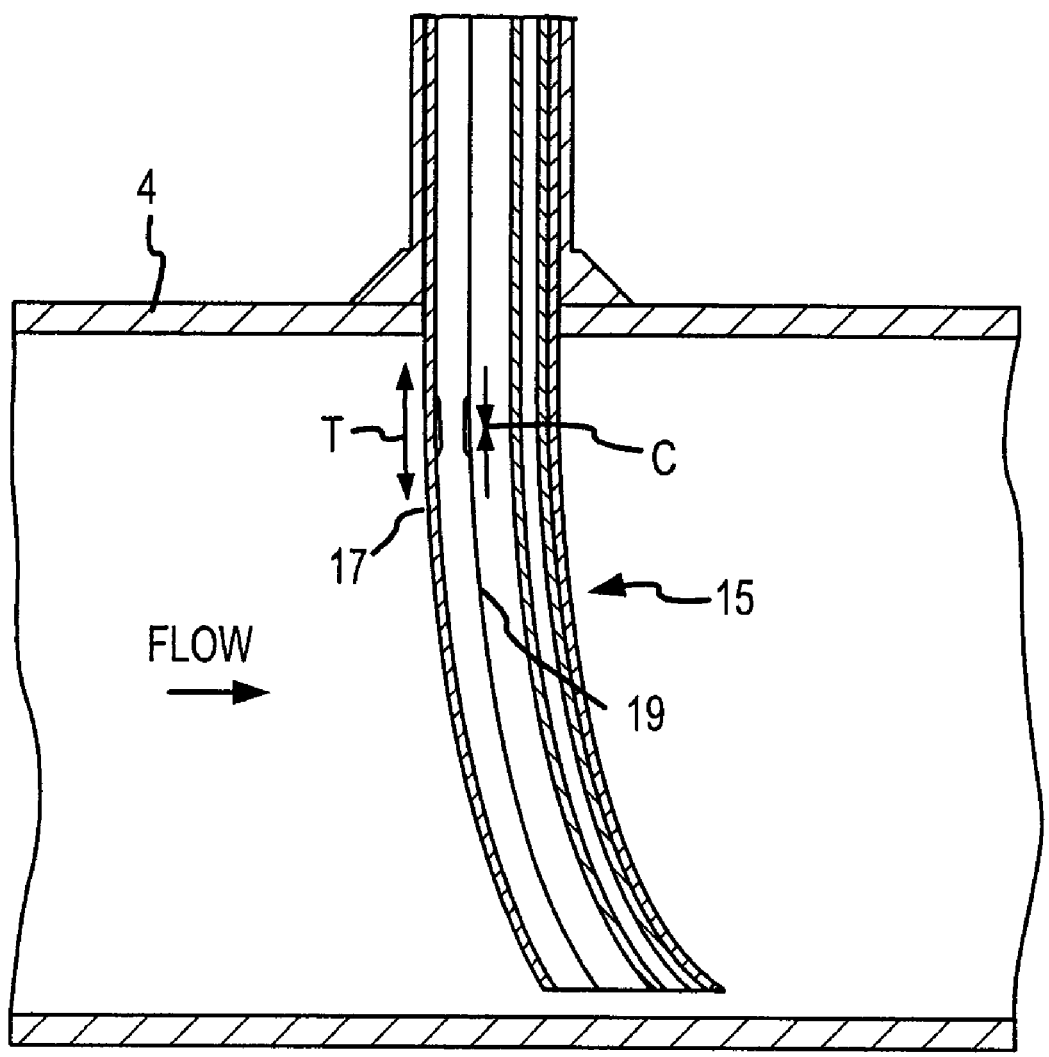
FIG. 4 is a diagrammatic side view of the bluff body of the present invention similar to FIG. 2, showing, in exaggerated scale, the bending of the body under the influence of fluid flowing in the conduit and highlighting the portion of the probe body that is under maximum tension and compression strain due to the pressure induced bending of the probe.

The cross sectional view of FIG. 2 illustrates the diametric placement of the bluff body 15 in a fluid carrying conduit 4. As seen in FIGS. 2 and 3, the body 15 comprises a hollow body the interior of which is sealed to prevent entry of fluid. The "T" shaped body has an upstream facing impact surface 17 and parallel downstream facing surfaces 19. Under the pressure of flowing fluid the bluff body tends to bend about the fulcrum formed at its single point of attachment to the pipe 4. The bending of the probe is greatly exaggerated in FIG. 4 in order to illustrate the internal tension T created in the member forming the upstream face 17 of the probe body 15 and the compression C created in the member forming the downstream facing surface 19. These tension and compression strains are maximized at a given distance from the fulcrum. According to the present invention strain gages are attached to the interior sides of the upstream and downstream facing parts of the bluff body to measure the strain produced by a given flow rate of fluid. In order to maximize the electrical signal produced by the strain gages, it is desirable to place two spaced apart strain gages 21a and 21b on the inside of the upstream facing portion of the bluff body and two spaced apart strain gages 23a and 23b on the downstream facing member. The upstream gages 21 will sense the tension produced strain (+) in the bluff body while the downstream strain gages 23 will sense the compressive strain (−).

Figure 5:
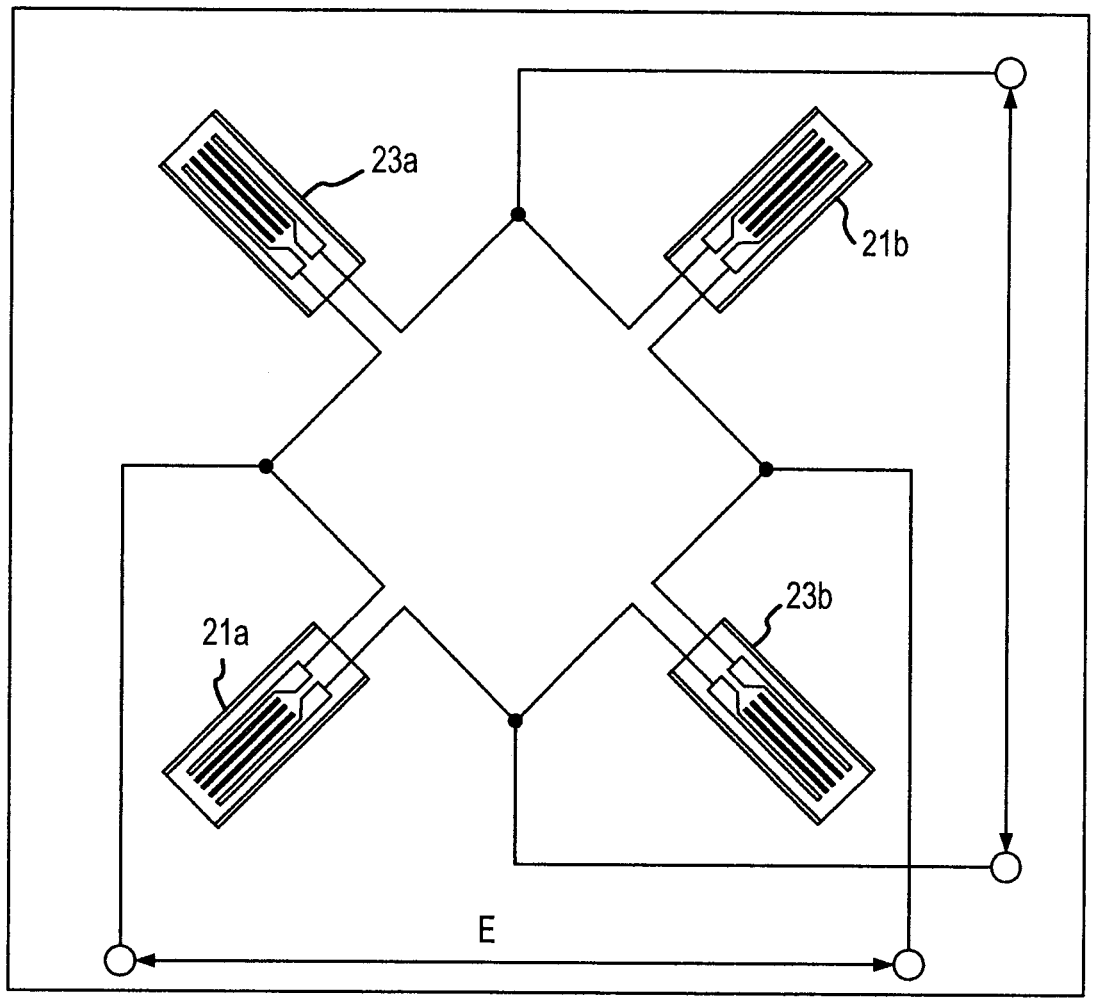
FIG. 5 is a partial circuit diagram showing the connection into a full Wheatstone ridge of the strain gages that are attached to the bluff body to measure the strains produced by the fluid pressures.

Each of the four resistive strain gages is provided with a pair of electrically conducting leads that are interconnected to form a full Wheatstone bridge 30, as shown in FIG. 5. An appropriate voltage source E is connected across opposing corners of the bridge while the bridge output voltage $e_o$ is measured across the other two opposing corners of the bridge. Having both (+) and (−) strain gages doubles the sensitivity of the strain measurement. In the environment of a Wheatstone bridge the voltages across the gages on opposite sides of the bridge will add together while the voltages across the gages next to each other will subtract from one another. The input voltage E and the output voltage $e_o$ is conveyed to and from the strain gages by conventional electrical wiring 38. The output voltage is conveyed to the transmitter as a signal representative of the differential pressure across the bluff body.

It is seen that by applying strain gages to a pitot type of measuring probe that extends substantially across the diameter of the fluid conducting conduit 4, the pressure averaging effect that is achieved with an averaging pitot tube is also realized with the strain gage measurement because the total bending of the cantilevered probe is a function of the average pressure on the probe.

The present invention maintains the averaging function of a pitot tube and also eliminates the fluid carrying impulse lines that interconnect the plenums with the exterior pressure sensors, thus greatly reducing the potential leakage and clogging problems inherent in impulse lines.

Figure 6:
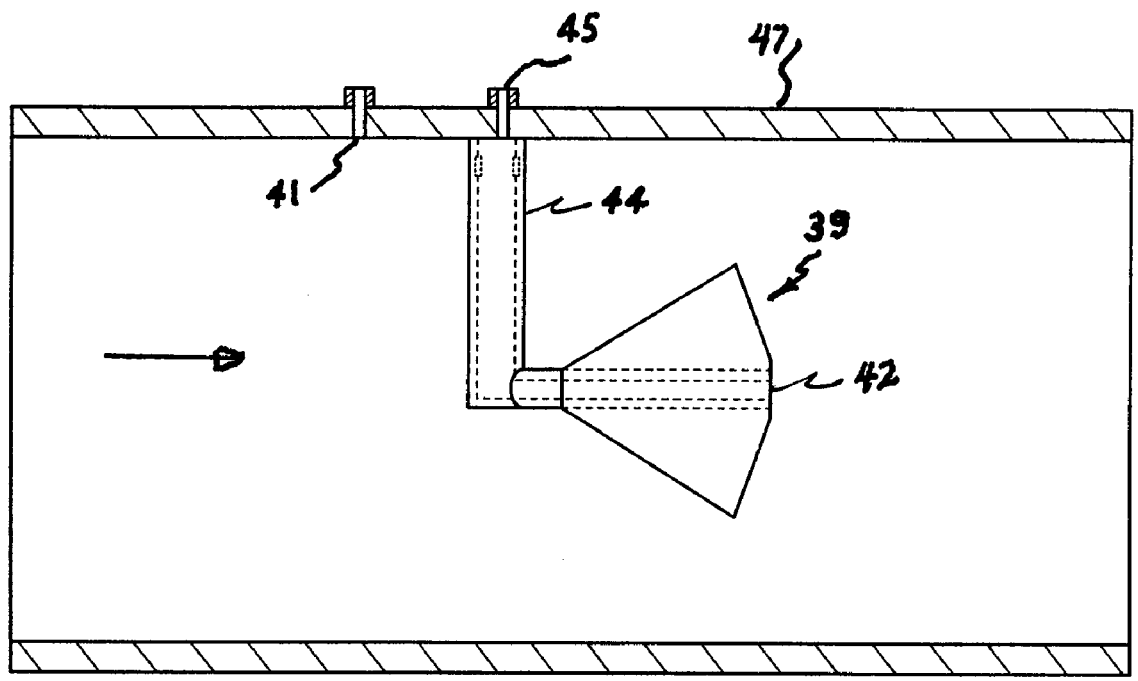
FIG. 6 is a cross sectional view of a fluid conducting pipe having inserted therein a V-cone type of flow meter utilizing strain gages to measure the strain on the arm that supports the V-cone.
Figure 7:
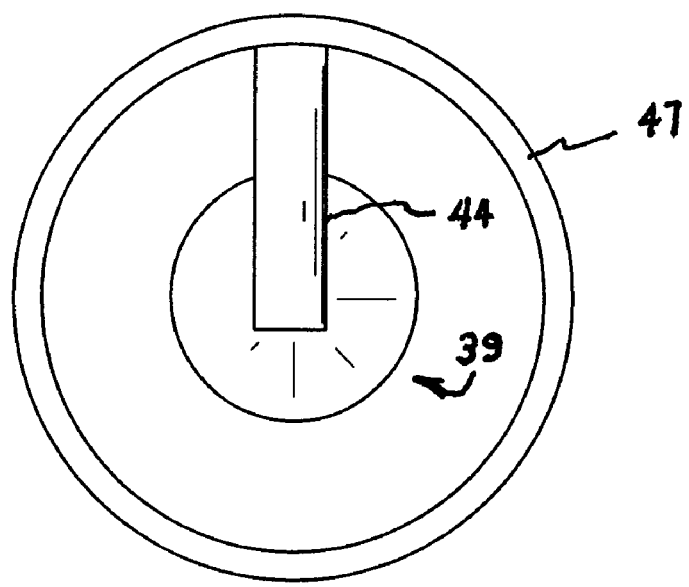
FIG. 7 is and end view of he V-cone meter disposed inside a fluid conducting pipe.

In addition to their application to averaging pitot tube types of differential pressure flow meters, strain gages can advantageously be applied to other types of DP flow meters, such as V-cone and orifice plate types. A V-cone flow meter 39 is shown in FIGS. 6 and 7 where the pressure difference is traditionally exhibited between the upstream static line pressure port 41 and the low pressure created downstream of the cone that is sensed on the face 42 of the cone and transmitted through a supporting conduit 44 to the low pressure port 45 in the fluid conducting pipe 47. To replace the pressure ports 41 and 45 and the associated impulse lines (not shown) a plurality of strain gages are applied to the inside surfaces of the support conduit 44 near the point of connection between that conduit and the fluid conducting pipe 47. The difference between the high static pressure of the flowing fluid and the low pressure created on the face 42 of the cone is equated, or at least proportional, to the bending strain induced in the conduit 44 by the flowing fluid. As with the bluff body of FIGS. 2 and 4, the strain on support conduit 44 produces tension in the strain gage 51 and compression in the strain gage 53 as a function of the bending strain in the conduit. The tension and compression strain gages 51 and 53 are interconnected into an electrical measurement device such as the full Wheatstone Bridge which is similar to that shown in FIG. 5 except that strain gages 51 and 53 replace gages 21a and 23a with the other legs of the bridge being replace by fixed resistances.

Figure 8:
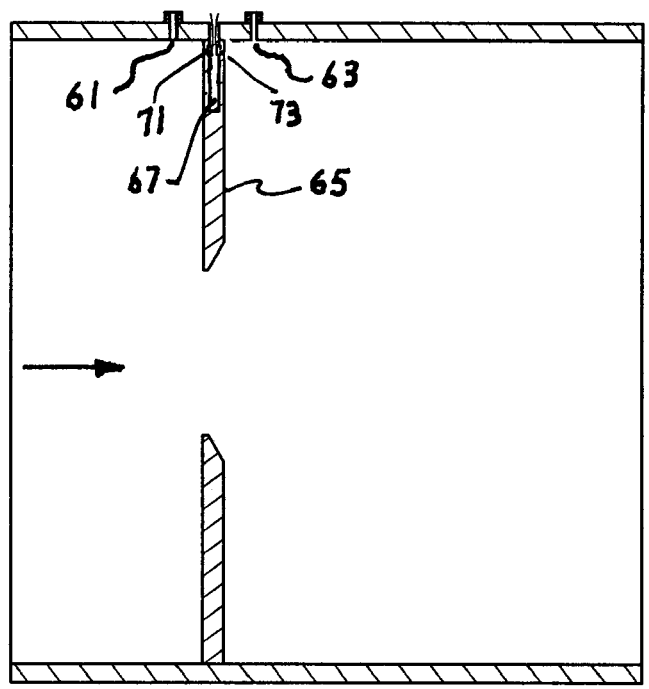
FIG. 8 is a cross sectional view of a fluid conducting pipe having a orifice plate flow meter placed across the inside of the pipe and where the orifice plate is provided with strain gages to measure the strain on the orifice plate.
Figure 9:
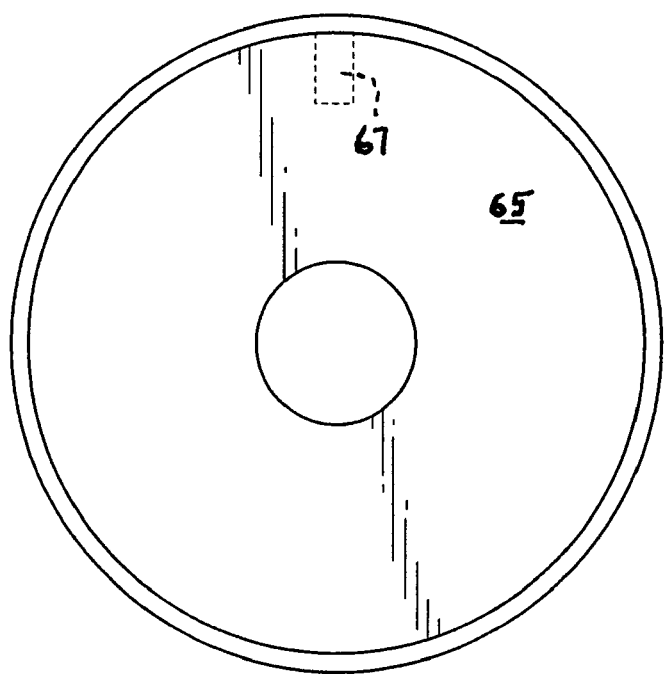
FIG. 9 is an end view of the orifice plate of FIG. 8.

FIGS. 8 and 9 illustrate the use of strain gages to replace the impulse lines usually associated with the high and low pressure ports 61 and 63 of an orifice plate flow meter 65. Near the circumferential edge of the orifice plate an internal space 67 is created in the plate. At least one tension sensing electrical strain gage 71 is placed on the upstream inside surface of the space 67 and a compression sensing electrical strain gage 73 is place on the inside surface of the downstream side of the space 67. The strain gages 71 and 73 are electrically interconnected into a full Wheatstone Bridge, as shown with gages 51 and 53 of the FIG. 6 embodiment of the invention. As with the previously mentioned types of flow measurement devices, the differential pressure between the upstream and downstream sides of the orifice plate are reflected in the difference between the tension and compression of the walls of the space 57 induced by the flowing fluid and the action of the orifice plate.

What is claimed is:

1. A differential pressure fluid flow meter comprising,
    a hollow bluff body for insertion into fluid flowing in a conduit and having an exterior upstream facing portion, an exterior downstream facing portion and interior surfaces,
    at least one first electrically resistive strain gage having connecting terminals and disposed on the interior surface of the upstream facing portion, and at least one second electrically resistive strain gage having connecting terminals and disposed on the interior surface of the downstream facing portion.

2. The flow meter of claim 1 and further including electrical measuring means interconnected to the terminals of the first and second resistive strain gages for measuring the differential strain between the upstream facing portion and the downstream facing portion of the hollow bluff body.

3. The flow meter of claim 2 where the measuring means includes a Wheatstone bridge where the first and second resistive strain gages comprise at least two legs of the bridge.

4. The flow meter of claim 3 where the at least one first electrically resistive strain gage comprises two spaced apart strain gages and the at least one second electrically resistive strain gage comprises two spaced apart strain gages.

5. The flow meter of claim 4 where the two first strain gages comprise a first set of opposing legs of the Wheatstone bridge and the two second strain gages comprise a second set of opposing legs of the Wheatstone bridge.

6. The flow meter of claim 5 and further including a source of electrical voltage and means connecting the voltage source across a first set of opposing corners of the bridge that includes two legs of the Wheatstone bridge that comprise one first strain gage and one second strain gage.

7. The flow meter of claim 6 and further including output voltage sensing means and means connecting the said sending means across a second set of opposing corners of the bridge that includes two legs of the Wheatstone bridge that comprise one first strain gage and one second strain gage.

8. A differential pressure fluid flow meter comprising,
an obstructive body for insertion into fluid flowing in a conduit and having a hollow portion therein with upstream and downstream facing walls,
means carried on the inside of the upstream facing wall for measuring the tension strain in the upstream facing wall caused by the pressure of the flowing fluid, and
means carried on the inside of the downstream facing wall for measuring the compression strain in the downstream facing wall caused by the flowing fluid.

9. The flow meter of claim 8 where the means for measuring tension and compression strains are electrical strain gages.

10. The flow meter of claim 9 and further including a Wheatstone bridge wherein the electrical strain gages comprise at least two legs of the bridge.

11. The flow meter of claim 10 and further including a voltage source applied across first diagonal corners of the bridge and voltage measurement means connected across second diagonal corners of the bridge, said voltage measurement means responsive to the difference between the tension strain and the compression strain in at least a portion of the obstructive body.

12. A method of measuring the rate of flow in a conduit carrying fluid from an upstream to a downstream location, comprising the steps of,
sensing tensional strain on the upstream facing impact surface of a body disposed within the conduit,
sensing compression strain on the downstream facing non-impact surface of the body disposed within the conduit,
comparing the sensed tension and compression strains to arrive at a differential strain value; and
calculating fluid flow rate using the differential strain value.

* * * * *